(12) United States Patent
Kulkarni et al.

(10) Patent No.: US 10,990,679 B2
(45) Date of Patent: Apr. 27, 2021

(54) METHODS, SYSTEMS, ARTICLES OF MANUFACTURE AND APPARATUS TO VERIFY APPLICATION PERMISSION SAFETY

(71) Applicant: McAfee, LLC, Santa Clara, CA (US)

(72) Inventors: Dattatraya Kulkarni, Bangalore (IN); Himanshu Srivastava, Bangalore (IN); Raj Vardhan, Bangalore (IN); Raja Sinha, Bangalore (IN); Srikanth Nalluri, Bangalore (IN); Tirumaleswar Reddy Konda, Bangalore (IN)

(73) Assignee: McAfee, LLC, San Jose, CA (US)

( * ) Notice: Subject to any disclaimer, the term of this patent is extended or adjusted under 35 U.S.C. 154(b) by 392 days.

(21) Appl. No.: 15/972,803

(22) Filed: May 7, 2018

(65) Prior Publication Data
US 2019/0340360 A1    Nov. 7, 2019

(51) Int. Cl.
*G06F 21/00* (2013.01)
*G06F 21/57* (2013.01)

(52) U.S. Cl.
CPC ........ *G06F 21/57* (2013.01); *G06F 2221/033* (2013.01)

(58) Field of Classification Search
CPC .......................... G06F 21/57; G06F 2221/033
See application file for complete search history.

(56) References Cited

U.S. PATENT DOCUMENTS

| 8,769,395 B2 * | 7/2014 | Boliek | H04N 19/64 |
| | | | 715/209 |
| 8,769,676 B1 * | 7/2014 | Kashyap | G06F 21/554 |
| | | | 726/22 |

(Continued)

FOREIGN PATENT DOCUMENTS

| CN | 106951786 | 7/2017 |
| EP | 2563056 | 2/2013 |
| WO | 2013184799 | 12/2013 |

OTHER PUBLICATIONS

International Searching Authority, "International Search Report," mailed in connection with International Patent Application No. PCT/US2019/030872, dated Jul. 29, 2019, 5 pages.

(Continued)

*Primary Examiner* — Ghodrat Jamshidi
(74) *Attorney, Agent, or Firm* — Hanley, Flight & Zimmerman, LLC

(57) ABSTRACT

Methods, apparatus, systems and articles of manufacture are disclosed to verify application permission safety. An example apparatus to identify unsafe permissions associated with a candidate app disclosed herein includes an app classifier interface to retrieve a cluster of apps associated with the candidate app, the candidate app including a requested permission set (RPS), a trusted app (TA) identifier to identify a set of TAs within the cluster, the set of TAs associated with a designation of trust, a safe permission set (SPS) evaluator to generate an SPS list associated with the set of TAs within the cluster, and an RPS identifier to determine whether permissions of the RPS are listed in the SPS list, the SPS evaluator further to designate first respective ones of the permissions of the RPS as safe when the first respective ones of the permissions are listed in the SPS list, and designate second respective ones of the permissions of the RPS as unsafe when the second respective ones of the permissions are absent from the SPS list.

14 Claims, 11 Drawing Sheets

(56) References Cited

U.S. PATENT DOCUMENTS

| | | | | |
|---|---|---|---|---|
| 9,009,819 B1* | 4/2015 | Savant | ............... | G06F 21/554 |
| | | | | 726/22 |
| 2007/0130532 A1* | 6/2007 | Fuller | ............... | G06F 3/0482 |
| | | | | 715/764 |
| 2012/0110174 A1* | 5/2012 | Wootton | ............... | H04W 4/00 |
| | | | | 709/224 |
| 2013/0055411 A1* | 2/2013 | Yang | ............... | H04W 4/50 |
| | | | | 726/30 |
| 2013/0333039 A1* | 12/2013 | Kelly | ............... | G06F 21/51 |
| | | | | 726/24 |
| 2014/0366143 A1* | 12/2014 | Sandler | ............... | G06F 21/51 |
| | | | | 726/25 |
| 2017/0068810 A1* | 3/2017 | Yao | ............... | G06F 21/53 |
| 2017/0076099 A1* | 3/2017 | Yao | ............... | G06F 21/562 |
| 2019/0253430 A1* | 8/2019 | Gamache | ............... | H04L 63/104 |

OTHER PUBLICATIONS

International Searching Authority, "Written Opinion," mailed in connection with International Patent Application No. PCT/US2019/030872, dated Jul. 29, 2019, 8 pages.

App Guarden, "App Guarden Resilient Application Stores," retrieved May 2, 2018, from http://groups.inf.ed.ac.uk/security/appguarden/Home.html, 2 pages.

Jana et al., "Apples and Oranges: Detecting Least-Privilege Violators with Peer Group Analysis," arXiv:1510.07308v1, Oct. 25, 2015, 11 pages.

* cited by examiner

METHODS, SYSTEMS, ARTICLES OF MANUFACTURE AND APPARATUS TO VERIFY APPLICATION PERMISSION SAFETY

FIELD OF THE DISCLOSURE

This disclosure relates generally to mobile device security, and, more particularly, to methods, systems, articles of manufacture and apparatus to verify application permission safety.

BACKGROUND

In recent years, application distribution, downloading and usage has become a ubiquitous aspect of computing devices, particularly with regard to mobile computing devices such as wireless telephones and tablets. Operating system manufacturers/designers of such computing devices typically manage an application store (hereinafter referred to as an "app-store") to showcase, index and/or otherwise provide one or more apps to users. Example app-stores include, but are not limited to Google Play (previously Android Market) for Android-based devices, the Amazon Appstore for Android, and the App Store for Apple-based devices.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1A:
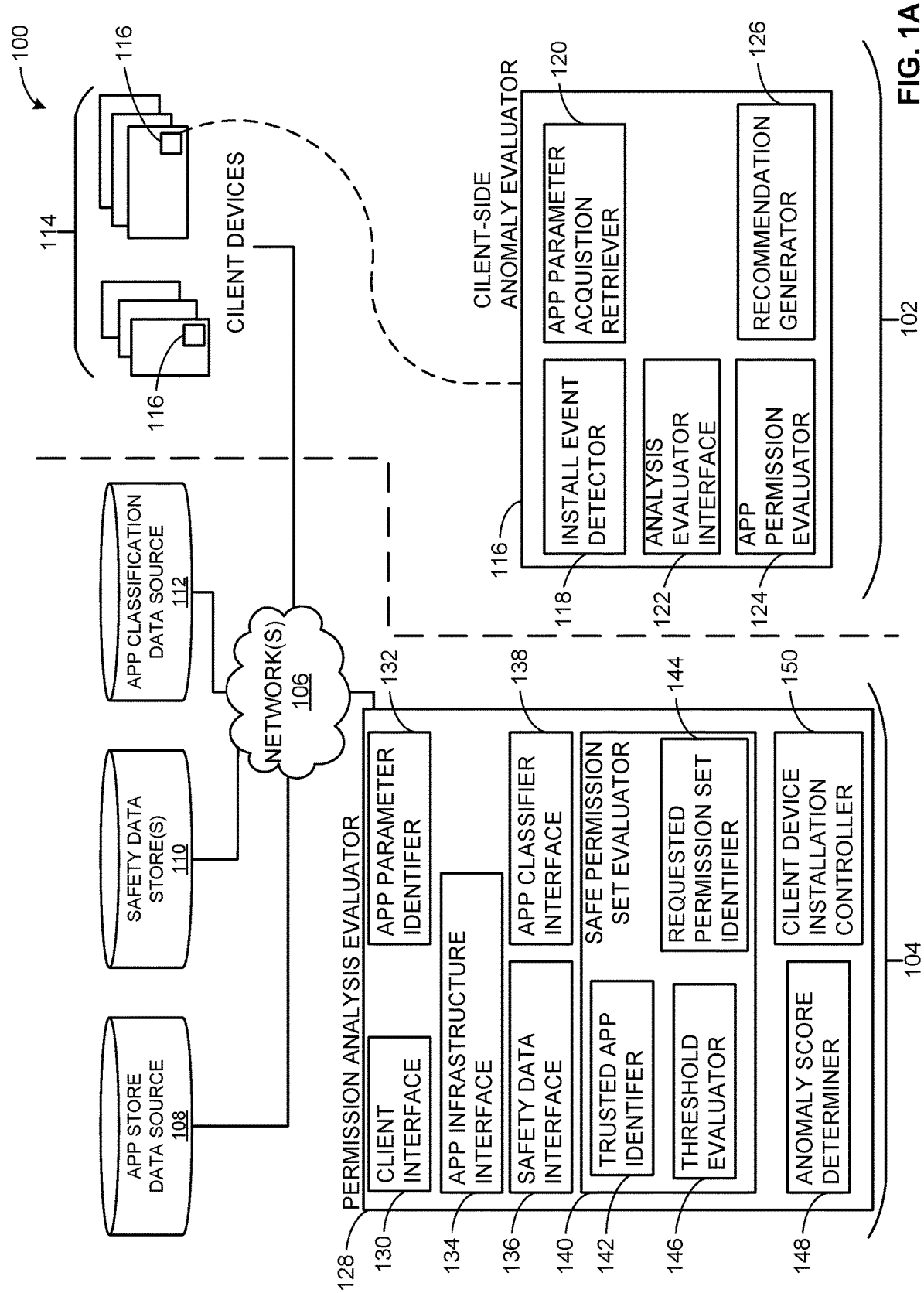
FIG. 1A is a schematic illustration of an example app permission safety system to verify application permission safety constructed in accordance with the teachings of this disclosure.

Installation of applications (hereinafter "apps") on computing devices sourced from an application store (e.g., a network/cloud-based repository for apps, hereinafter referred to as an "app store") is typically associated with one or more access permission requests and corresponding acknowledgements to those one or more access permission requests. As used herein, "access permissions" refer to one or more authorizations of an app to obtain data and/or services that the app will have when operating (e.g., executing) on computing devices (e.g., mobile phone, tablet, etc.). Access permissions include, but are not limited to, access (by the app) to user contacts/address book information, access to geographic location information (e.g., GPS coordinates), access to other apps installed on the computing device, access to text messages, access to e-mail messages, access to a phone number (e.g., of the user), access to a camera of the computing device, etc.

With growing frequency, apps invoke access permission requests that seek access to data on devices that are not necessary to facilitate an expected service and/or functionality of the app after it is installed and/or otherwise operating on the destination computing device. Generally speaking, whether a certain kind of permission is extraneous to the operation or functioning of the requesting apps depends on, in part, other factors that are difficult for a computing device to determine, such as the functionality that is expected from the app. As such, some traditional approaches at determining a metric or degree of safety for an app and/or permissions requested by the app look to objective factors, such as a quantity of requested permissions by the app. However, such factors do not necessarily indicate app safety. For instance, an app requesting (a) a location of the mobile device, (b) access to text messages of the mobile device, (c) access to calling features of the mobile device, (d) knowledge of e-mail address associated with the mobile device and (e) ability to send location data to a website is expected for a commuter app (e.g., Uber, Wia, Lyft, etc.). On the other hand, a flashlight app may request relatively fewer permissions, thereby resulting in a safety metric having a relatively better score and/or indication of safety that the commuter app, even though the permission requests of the commuter app are legitimate. However, despite the flashlight app having a relatively lower number of permissions requests for access and/or resources of the wireless device, certain specific permission requests may be unsafe in view of the context of the purpose and/or intended functionality of the app.

For example, while the flashlight app may request camera access (e.g., to turn on the light associated with a camera system of the mobile device), if the flashlight app also requests access to the location of the wireless device, then such app behavior may be deemed harmful to the privacy of the user of the mobile device. In other words, a location-based permission does not contribute to the functionality of an app that is intended to allow the wireless device to operate as a flashlight. As such, permitting the flashlight app to access location data may be unsafe. In some examples, a permission request for a flashlight app that is related to location information of the wireless device may indicate that the app developer is using location information for advertisement targeting, which is not a core purpose/functionality of the app as promoted by, for example, information located in an app store (e.g., the iOS App Store). Such extraneous permissions may put a user of the app at risk of disclosing personal information to the app developer and/or one or more third party data aggregators associated with the app developer. Accordingly, traditional efforts to identify unsafe apps by virtue of a raw or aggregate count of permission requests is not necessarily indicative of safety. Similarly, traditional efforts to identify unsafe apps by virtue of a specific type of permission request (e.g., location) is not necessarily indicative of an unsafe app, such as the example commuter app (e.g., Uber®, GoogleMaps®, etc.) described above that requires location information as a core and/or otherwise necessary piece of information to facilitate proper app functionality.

Example methods, systems, articles of manufacture and apparatus disclosed herein verify application safety by, in part, identifying anomalous permissions and detecting corresponding anomaly scores (e.g., risk scores) of the identified anomalous permissions. Examples disclosed herein enable and/or otherwise facilitate improved user decision-making when presented with an option to install an app and/or otherwise enable/allow one or more requested permission(s) associated with the app. In some examples, the anomaly scores related to an app and/or one or more requested permissions of the app facilitate installation and/or configuration activities on a target computing device (e.g., a wireless telephone) in a manner that reduces user confusion and/or user ambiguity when determining whether to install a candidate app and/or whether to allow/permit one or more permissions associated with the candidate app.

In some examples, users sometimes struggle with making informed decisions related to app safety and/or decisions related to which requested permissions to allow or deny. As such, users may consume a tedious amount of time when trying to make safe installation and/or configuration decisions. To avoid such tedium, users may fail to review and/or otherwise research the requested permissions and, instead, hastily accept any requested permissions to get the app to work on their computing device. Examples disclosed herein improve user efficiency when installing candidate apps on a computing device by providing installation recommendation(s) based on metrics associated with the underlying purpose or functional objective(s) of the candidate apps.

FIG. 1A is a schematic illustration of an example application (app) permission safety system 100. In the illustrated example of FIG. 1A, the app permission safety system 100 includes a client-side environment 102 and a server-side environment 104. The example client-side environment 102 and the example server-side environment of the example app permission safety system 100 are communicatively connected to a network 106 (e.g., an intranet, the Internet, a local area network (LAN), a wide area network (WAN), etc.). The example network 106 in the illustrated example of FIG. 1A is used-by and/or otherwise accessed-by the example app permission safety system 100 to communicatively connect to an example app store data source 108 (e.g., a third-party database), an example safety data store 110 (e.g., a database), and an example app classification data source 112 (e.g., a database). The example app store data source 108 includes any type of application store that showcases, indexes, advertises, promotes, sells, licenses, rents and/or otherwise provides one or more apps to users of computing devices. The example app store data source 108 includes, but is not limited to Google Play (formerly known as "Android Market"), the Amazon Appstore, the iOS App Store (for Apple-based devices), etc. Typically, the example app store data source 108 includes information related to: an app category (as determined by the entity managing the app store data source); related apps; descriptions of the app; ratings of the app (e.g., user ratings); a count/number of installs of the app on computing devices; and/or information related to app reviews. The example safety data store 110 of FIG. 1A is a data source (e.g., a database) that includes app safety metrics and/or data related to malware reports, virus reports and/or behavior reports associated with one or more apps of interest.

The example app classification data source 112 of FIG. 1A is a data source (e.g., a database) that includes classification information associated with one or more apps of interest. In some examples, classification information related to an app sourced from the example app store data source 108 lacks a degree of granularity or specificity, which prohibits accurate comparisons of other similar apps. For example, the Google Play Store includes relatively broad and/or otherwise vague app categories, such as a Communication category, a Productivity category, a Tools category, etc. To illustrate, apps related to e-mail services, instant messaging services, and web-browsing services all fall into a Communication category in the Google Play Store. This limited degree of granularity makes it difficult to distinguish one app functionality over another app functionality based on the classification. On the other hand, the example app classification data source 112 of FIG. 1A employs one or more machine learning techniques to improve a degree of granularity with respect to categorical classification of the apps. For example, the example app classification data source 112 categorizes and/or otherwise places apps into granular categories, such as an e-mail category, a chat category, a browser category, a calculator category, a flashlight category, etc. In some examples, the app classification data source 112 applies a Naïve Bayes text-classification approach to develop granular categorical information associated with apps of interest. Some examples may be machine learning to categorize apps.

The example network 106 of the illustrated example of FIG. 1A is also communicatively connected to any number of client devices 114 associated with the example client-side environment 102. Client devices may include any type of computing devices, but are not limited to personal computers (PCs), tablets and wireless telephones (e.g., Smartphones). The example client devices 114 of FIG. 1A include a respective client-side anomaly evaluator 116, which includes an example install event detector 118, an example app parameter acquisition retriever 120, an example analysis evaluator interface 122, an example app permission evaluator 124, and an example recommendation generator 126. In the illustrated example of FIG. 1A, the install event detector 118 implements a means for detecting installation, the app parameter acquisition retriever 120 implements a means for acquiring a parameter, the analysis evaluator interface 122 implements a means for evaluating analysis, the app permission evaluator 124 implements a means for evaluating a permission, and the recommendation generator 126 implements a means for recommending.

The example network 106 of the illustrated example of FIG. 1A is also communicatively connected to a permission analysis evaluator 128 associated with the example server-side environment 104. The example permission analysis evaluator 128 includes an example client interface 130, an example app parameter identifier 132, an example app infrastructure interface 134, an example safety data interface 136, an example app classifier interface 138, an example safe permission set evaluator 140, an example trusted app (TA) identifier 142, an example requested permission set identifier 144, an example threshold evaluator 146, an example anomaly score determiner 148, and an example client device installation controller 150. In the illustrated example of FIG. 1A, the app classifier interface 130 implements a means for retrieving, the TA identifier 142 implements a means for identifying, the safe permission set evaluator 140 implements a means for generating, and the requested permission set identifier 144 implements a means for determining. Additionally, in the illustrated example of FIG. 1A, the anomaly score determiner 148 is a determining means (sometimes referred to as a means for calculating or a means for determining), the threshold evaluator 146 is an evaluating means (sometimes referred to as a means for evaluating), the client device installation controller 150 is a generating means (sometimes referred to as a means for generating), and the client interface 130 is a transmitting means (sometimes referred to as a means for transmitting).

The example installation detecting means, the example parameter acquiring means, the example analysis evaluating means, the example permission evaluating means, the example recommending means, the example retrieving means, the example identifying means, the example generating means and the example determining means of this example is/are implemented by software executing on a hardware processor. Although it/they could instead be implemented by a logic circuit structured to perform logic operations to achieve the desired functionality, such as an ASIC, an FPGA or the like and/or a combination of such circuits and software and/or firmware.

In operation, the example client interface 130 determines whether a candidate application query has been received, such as a query from a computing device (e.g., a client device 114, such as a wireless telephone making a query via the client-side anomaly evaluator 116 to the example client interface 130). In response to detecting a query, the example app parameter identifier 132 identifies a corresponding app name, an app version and a requested permission set (RPS) associated with a candidate app to be evaluated and/or otherwise installed on a client device responsible for the candidate application query. As used herein, an RPS (sometimes referred to herein as an RPS list) includes one or more permissions that are requested by an app when installed on a computing device. In an effort to derive and/or otherwise obtain additional information associated with the candidate app under consideration, the example app infrastructure interface 134 queries the example app store data source 108 to identify category information, candidate related app information, app description information, rating information, a number/count of installs of the app on other computing devices and/or review information associated with the candidate app.

The example safety data interface 136 queries the example safety data store 110 to identify malware information, virus information and behavior information associated with the candidate app. Generally speaking, the example safety data store 110 includes aggregated information from static and/or dynamic code analyzers, malware detection services, and/or virus detection services, such as the example analysis services provided by McAfee®. As described above, while the example app store data source(s) 108 include information related to categories associated with the candidate app of interest, such categorical information may lack a degree of granularity to permit identification of similar apps. For instance, a flashlight app and a calculator app may be identified in the example app store data source(s) 108 as "productivity apps." However, while such apps may facilitate productivity tasks, an expected functionality for a flashlight app and a calculator app are substantially different.

Accordingly, the example app classifier interface 138 queries the example app classifier data source 112 to determine a cluster of other apps that are similar to the candidate app of interest. As described above, the example app classification data source 112 of FIG. 1A contains granular category information of known apps that are determined via one or more machine learning techniques. Thus, in the event the candidate app of interest is a flashlight app, then the example app classifier interface 138 receives and/or otherwise retrieves a cluster of other apps that are of the same or similar functionality (i.e., related to flashlight functionality). As described in further detail below, knowledge of other apps that belong to a cluster of apps having the same or substantially similar functionality assist in the determination of which permissions may be deemed anomalous as compared to which permissions may be deemed safe, normal and/or otherwise expected for the functionality of the apps in the cluster.

The example trusted app identifier 142 identifies a set of trusted apps (TAs) within the cluster of similar apps based on information from the example safety data store 110 and the example app store data source 108. Stated differently, TAs are indicative of apps deemed safe and/or otherwise trustworthy in view of an analysis of virus scan information, malware scan information, and/or behavior information from the example safety data store 110. In view of the trusted nature of TAs, a safe permission set (SPS) (e.g., sometimes referred to herein as an "SPS list" including any number of permissions) is determined in connection with TAs of the cluster associated with the candidate app of interest, as described in further detail below. Generally speaking, a permission requested by the candidate app is deemed anomalous in the event that particular permission is not also included in a threshold number of TAs in the same cluster. As such, the SPS list represents those permissions deemed safe and/or otherwise normal in view of how often such permissions appear in connection with known trusted TAs.

The example safe permission set (SPS) evaluator 140 identifies an SPS (e.g., in a list format of one or more permissions) associated with the cluster of similar apps (e.g., apps associated with a flashlight category). In particular, the example TA identifier 142 selects a TA associated with the identified cluster, and the requested permission set (RPS) identifier 144 identifies an RPS (e.g., in a list format of one or more permissions) associated with the selected TA. For example, an RPS for a video recorder app may be a list including a first permission to access a camera of the computing device, and a second permission to access a microphone of the computing device. The example RPS identifier 144 selects a permission from the RPS (e.g., a first one of the permissions in the RPS associated with the selected TA), and identifies a number of apps within the cluster set (list) of TAs that also include the same permission in their respective RPS. The example threshold evaluator 146 calculates whether the identified number of apps having that same permission satisfies a threshold quantity value and, if so, the example SPS evaluator 140 adds the selected permission to an SPS list of the cluster. In other words, if a threshold amount of TAs also include the same permission in their respective RPS, then that particular permission may be deemed normal and/or otherwise safe. On the other hand, in the event the identified number of apps fails to satisfy the threshold quantity value, the example SPS evaluator 140 does not add the selected permission to the SPS list, in which case the selected permission is absent from the SPS list.

While the above example considered one permission from the RPS of the TA, the example RPS identifier 144 determines whether there are one or more additional permissions to be analyzed. If so, the above example repeats in view of a next permission of the RPS associated with the selected TA. Additionally, while the above example considered one TA from the cluster of TAs, the example TA identifier 142 determines whether there are one or more additional TAs to be analyzed. If so, the above example repeats in connection with a next selected TA app from the cluster of TAs associated with the category of interest (e.g., flashlight apps).

When the SPS of the cluster (e.g., a cluster of flashlight apps) associated with the candidate app (e.g., a flashlight app) to be installed is determined, the SPS evaluator 140 determines which one or more permissions of the RPS of the candidate app are to be deemed anomalous or safe. In particular, the example RPS identifier 144 selects a permission (e.g., a first permission from a list of any number of permissions named in the RPS) from the RPS of the candidate app, and the example SPS evaluator 140 determines if that permission is within (e.g., listed) the SPS list of the cluster. If so, then the example SPS evaluator 140 designates the selected permission as safe and/or otherwise normal. However, in the event the selected permission is not within the SPS of the cluster, the example SPS evaluator 140 designates (e.g., flags) the selected permission as anomalous and/or otherwise unsafe. Additionally, the example SPS evaluator 140 flags the selected permission for calculation of a corresponding anomaly score (deviation index), as described in further detail below.

While the above example considered one of the permissions of the RPS associated with the candidate app to be installed, the example RPS identifier 144 determines whether there are one or more additional permissions within the RPS to be evaluated for the candidate app to be installed. If so, the above example is repeated in connection with a next selected permission of the RPS of the candidate app to be installed.

When a list of flagged permissions from the RPS of the candidate app is determined, the example anomaly score determiner 148 calculates respective anomaly scores for those flagged permissions. Generally speaking, while some permissions within an RPS of a candidate app may not qualify for the SPS of the cluster associated with the candidate app, some permissions may have varying degrees of severity or risk to the security and/or privacy of the computing device on which the candidate app is installed. Such degrees of severity are based on a relative threshold of occurrence within the cluster of similar apps. For instance, certain permissions that do not reside in RPSs of that cluster as frequently as other permissions (e.g., other permissions that occur with a relatively greater frequency) will be deemed more severe and/or otherwise potentially dangerous to an end-user of the candidate app to be installed.

In particular, the example anomaly score determiner 148 retrieves the list of flagged permissions that have been designated as anomalous. One of those flagged permissions is selected by the example anomaly score determiner 148, and a number of apps (N) within the cluster of similar apps is calculated that do not include that selected flagged permission within their respective RPS. Based on the calculated number of apps failing to include the flagged permission within the cluster (the cluster having a quantity of C apps), the example score calculator 148 calculates a deviation index (DI, also referred-to herein as a "permission score" or an "anomaly score") in a manner consistent with example Equation 1.

$$\text{Deviation Index} = \frac{N}{C}. \quad \text{Equation 1}$$

In the illustrated example of Equation 1, a relatively greater DI value is indicative of an associated greater severity or threat of the associated permission. Stated differently, a greater value of the number of apps (N) within the cluster that fail to include the requested permission illustrates a relative greater degree of rarity in the need for that requested permission. For instance, if the candidate app to be installed is a flashlight app having a permission that requests location access also occurs in many apps within the cluster, thereby reducing the value of N above, then this circumstance may be indicative of many app developers using that permission for the purpose of targeted advertising (despite the fact that location information is not a necessary permission required to facilitate an ability to turn on/off the flashlight). On the other hand, if the candidate flashlight app to be installed has a permission that requests access to contact information, which is not a similar permission found in the other apps of the cluster (thereby increasing the value of N above), then this circumstance may be indicative of a privacy risk to the end-user and/or otherwise threaten the security of the computing device (e.g., mobile phone) associated with the flashlight app.

Based on the calculated anomaly scores and/or permissions designated as safe or unsafe, the example client device installation controller 150 generates one or more installation directives. In particular, the example RPS identifier 144 selects a permission from the RPS associated with the candidate app to be installed. The example SPS evaluator 140 determines whether the selected permission is designated as unsafe and, if not, the example client device installation controller 150 generates an allowance directive. As used herein, a directive is a command or instruction tailored to cause another system or device (e.g., a client device 114, such as a target wireless telephone) to perform an action. In some examples, a directive is a recommendation that, if enabled by the example client device(s) 116, facilitates installation control of apps and/or particular app permissions based on the recommendation (e.g., allow, deny). Directives generated by the example client device installation controller 150 may be of different types. In some examples, the directives may be of a type prohibitive (e.g., a prohibition directive). In some examples, the directives may be of type permissive (e.g., an allowance directive). In some examples, the directives may be of type discretionary. For instance, an allowance directive is an instruction that, when received and/or otherwise retrieved by the target device (e.g., a target wireless telephone), causes the target device to permit allowance of the associated permission. On the other hand, in the event the example SPS evaluator 140 determines that the selected permission is designated as unsafe, then the example threshold evaluator 146 compares a deviation index value of the unsafe app against a deviation index threshold value. If satisfied (e.g., exceeded), then the example client device installation controller 150 generates a prohibition directive. If not satisfied (e.g., the permission is deemed unsafe, but the deviation index threshold is not satisfied (e.g., exceeded), thereby indicative of a lesser degree of severity), then the example client device installation controller 150 generates a discretionary directive. The example discretionary directive causes and/or otherwise invokes a target client device (e.g., invoking a GUI on one of the client devices 114 of FIG. 1A) to allow the user to decide whether to permit or deny the permission associated with the RPS of the candidate app to be installed.

In some examples, app and/or permission evaluation performed by the example permission analysis evaluator 128 is used by the client devices 114 to facilitate a more efficient installation of a target app. For example, some users unfamiliar with app permissions and/or how such app permissions may place their privacy and/or security at risk may struggle with how to decide whether to allow a permission or deny a permission when given such a choice. As such, in the event the example client-side anomaly evaluator 116 of the respective client device 114 allows directives from the example permission analysis evaluator 128 to control permission allowance and denial settings, then novice users may install apps without exhaustive research on a permission-by-permission basis. Instead, such permission allowance and/or denial may be controlled by the directives generated by the example permission analysis evaluator 128, as described in further detail below.

In some examples, app and/or permission evaluation performed by the example permission analysis evaluator 128 is used by the client devices 114 to facilitate user installation efficiency by providing recommendations on a permission-by-permission basis. In some examples, the client device installation controller 150 provides one or more results of tests performed on permissions from an RPS of a candidate app to be installed, as described above. In particular, the example client device installation controller 150 transmits permission analysis information to the example client-side anomaly evaluator 116 regarding whether particular permissions have been designated as safe, unsafe and/or corresponding deviation index value(s) to illustrate relative degrees of safety for those permissions that have not been designated as safe.

While examples described above substantially consider efforts of the example permission analysis evaluator 128 to verify application permission safety, the example client-side anomaly evaluator 116 within participating client devices 114 provide the example permission analysis evaluator 128 with at least some of the information needed to verify such app permission safety. In operation, the example client-side anomaly evaluator 116 executes and/or otherwise operates on participating client devices 114 in response to being installed as a software executable. In some examples, the client-side anomaly evaluator 116 includes circuit structure. In still other examples, the client-side anomaly evaluator 116 is a combination of software and circuit structure(s).

In operation, the example install event detector 118 determines whether an app install event occurs on the example client device 114. For instance, a user of the client device 114 may navigate to (e.g., via a graphical user interface (GUI) of the client device 114) and/or otherwise invoke an app store application of the client device 114 and select a candidate app for installation on the client device 114. In response to the example install event detector 118 identifying such an installation attempt, the example app parameter acquisition retriever 120 identifies a corresponding name of the candidate app to be installed, identifies a version of the candidate app to be installed, and identifies an RPS of the candidate app to be installed. In some examples, the app name, app version information and RPS of the candidate app to be installed are obtained by the app parameter acquisition retriever 120 from the app store application installed on the client device 114. The example analysis evaluator interface 122 transmits such information to the example permission analysis evaluator 128, in which such information is processed in the manner as described above.

The example app permission evaluator 124 retrieves such output from the example permission analysis evaluator 128, and the example recommendation generator 126 determines whether to apply directives received and/or otherwise retrieved from the permission analysis evaluator 128. Generally speaking, examples disclosed herein accommodate varying degrees of skill and/or familiarity with app management and/or corresponding permission requests. In some examples, relatively novice users do not appreciate the potential risk of allowing certain permissions associated with desired apps to be installed on their computing device. As such, example directives, when permitted by the client device 114, cause such apps and/or respective permissions to be allowed or denied in a more convenient and/or efficient manner that does not require user expertise and/or discretion.

Figure 1B:
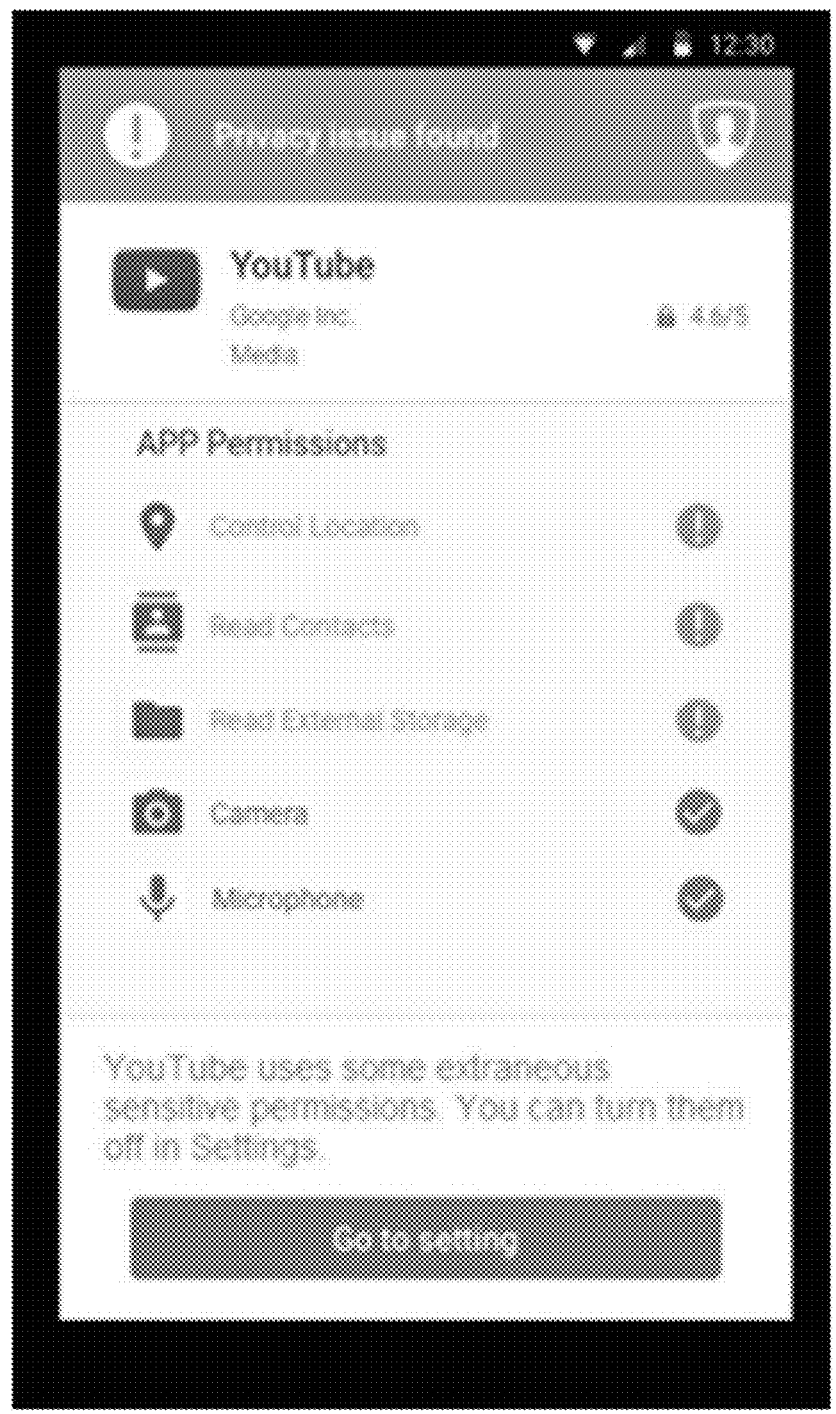
FIGS. 1B-1D are example graphical user interfaces (GUIs) generated by the example app permission safety system of FIG. 1A to verify application permission safety.
Figure 1C:
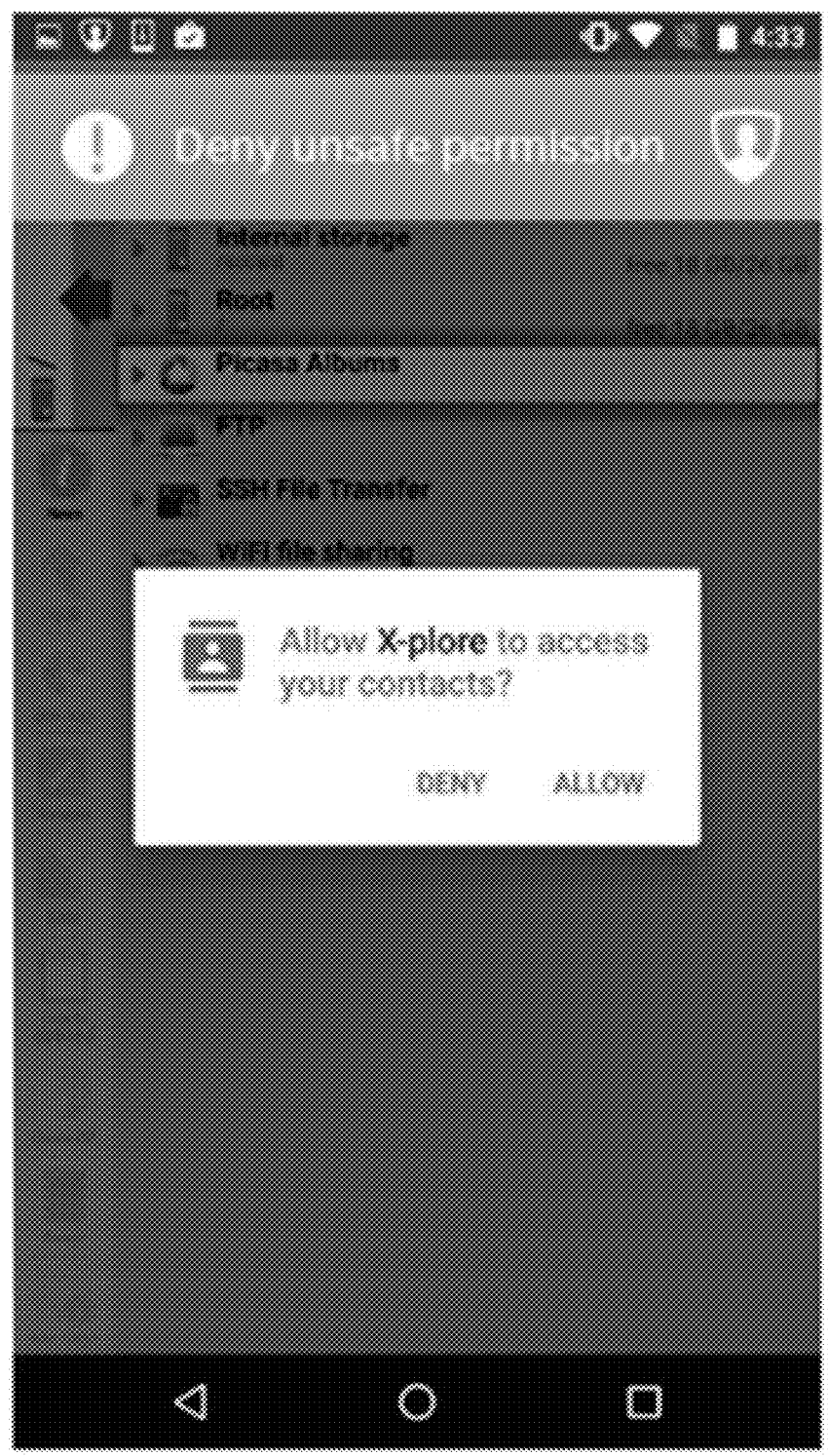
Figure 1D:
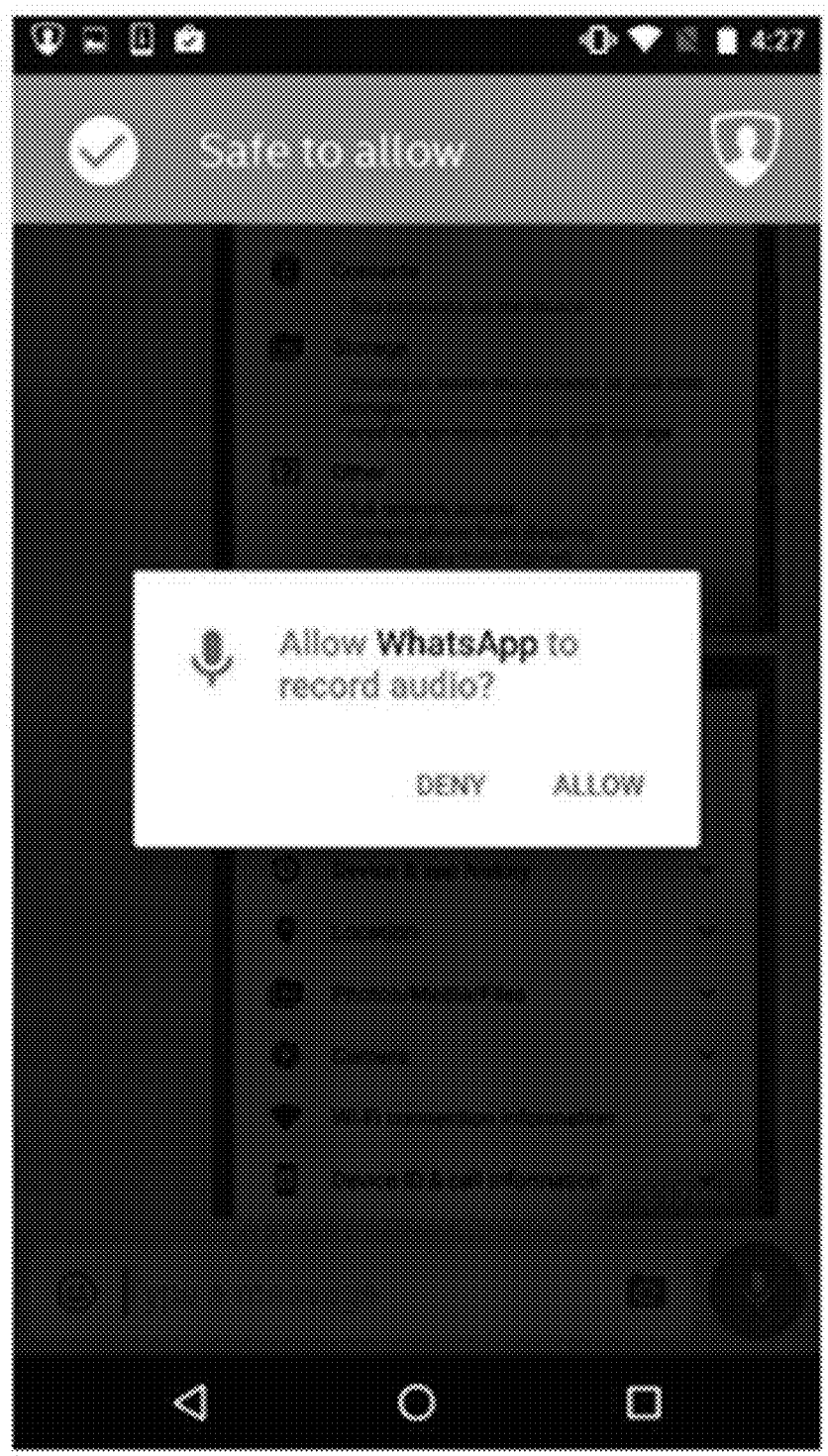

In the event the example recommendation generator 126 determines that directives are not to be used (e.g., a configuration setting on the computing device to ignore and/or otherwise disregarding installation directives from the example permission analysis evaluator 128), then the example app permission evaluator 124 selects a permission from the RPS list of the candidate app to be installed and determines whether it includes an associated indication of safety (e.g., an affirmative indication that the selected permission is safe). If not, then the example recommendation generator 126 generates an unsafe indicator for the selected permission (as shown in the illustrated example GUI of FIG. 1B) and presents (e.g., via a graphical user interface (GUI) of the target computing device) a recommendation to deny the selected permission (as shown in the illustrated example GUI of FIG. 1C). In some examples, the recommendation generator 126 also displays and/or otherwise provides a corresponding deviation index value for consideration by the end-user. On the other hand, in the event the example recommendation generator 126 identifies an indication of safety associated with the selected permission, then it generates a safe indicator (e.g., via the GUI as shown in the illustrated example of FIG. 1D) for the selected permission, and/or presents/displays a recommendation to allow the selected permission.

In the event the example recommendation generator 126 is to apply directives received and/or otherwise retrieved from the example permission analysis evaluator 128, then the example app permission evaluator 124 selects one of the permissions from the RPS of the candidate app to be installed on the computing device (e.g., the example client device 114). The example recommendation generator 126 determines whether the retrieved directive is of type discretionary (e.g., a discretionary directive). In particular, while directives may be used by the client device 114 to control app installation permissions, some directives designated as discretionary may be indicative of an app permission that, while not deemed safe, includes a corresponding deviation index that is not too severe (e.g., does not satisfy the example deviation index threshold, described above). In the event the directive is of type discretionary, then the example recommendation generator 126 prompts for a user selection (e.g., via a GUI of the example client device 114) to determine whether the requested permission is to be allowed or denied access to the target computing device. On the other hand, if the directive is not of type discretionary, as determined by the example recommendation generator 126, then it forces a corresponding permission setting to be allowed or denied based on the direction being of type allowance or prohibition, respectively.

While an example manner of implementing the app permission safety system 100 of FIGS. 1A-1D is illustrated in FIGS. 1A-D, one or more of the elements, processes and/or devices illustrated in FIG. 1A may be combined, divided, re-arranged, omitted, eliminated and/or implemented in any other way. Further, the example install event detector 118, the example app parameter acquisition retriever 120, the example analysis evaluator interface 122, the example app permission evaluator 124, the example recommendation generator 126, the example client-side anomaly evaluator 116, the example client interface 130, the example app parameter identifier 132, the example app infrastructure interface 134, the example safety data interface 136, the example app classifier interface 138, the example trusted app (TA) identifier 142, the example requested permission set (RPS) identifier 144, the example threshold evaluator 146, the example safe permission set (SPS) evaluator 140, the example anomaly score determiner 148, the example client device installation controller 150 and/or, more generally, the example permission analysis evaluator 128 of FIG. 1A may be implemented by hardware, software, firmware and/or any combination of hardware, software and/or firmware. Thus, for example, any of the example install event detector 118, the example app parameter acquisition retriever 120, the example analysis evaluator interface 122, the example app permission evaluator 124, the example recommendation generator 126, the example client-side anomaly evaluator 116, the example client interface 130, the example app parameter identifier 132, the example app infrastructure interface 134, the example safety data interface 136, the example app classifier interface 138, the example TA identifier 142, the example RPS identifier 144, the example threshold evaluator 146, the example SPS evaluator 140, the example anomaly score determiner 148, the example client device installation controller 150 and/or, more generally, the example permission analysis evaluator 128 of FIG. 1A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example install event detector 118, the example app parameter acquisition retriever 120, the example analysis evaluator interface 122, the example app permission evaluator 124, the example recommendation generator 126, the example client-side anomaly evaluator 116, the example client interface 130, the example app parameter identifier 132, the example app infrastructure interface 134, the example safety data interface 136, the example app classifier interface 138, the example TA identifier 142, the example RPS identifier 144, the example threshold evaluator 146, the example SPS evaluator 140, the example anomaly score determiner 148, the example client device installation controller 150 and/or, more generally, the example permission analysis evaluator 128 of FIG. 1A is/are hereby expressly defined to include a non-transitory computer readable storage device or storage disk such as a memory, a digital versatile disk (DVD), a compact disk (CD), a Blu-ray disk, etc. including the software and/or firmware. Further still, the example app permission safety system 100 of FIG. 1A may include one or more elements, processes and/or devices in addition to, or instead of, those illustrated in FIG. 1A, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example app permission safety system 100 of FIGS. 1A-1D are shown in FIGS. 2-7. The machine-readable instructions may be an executable program or a portion of an executable program(s) for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entire program(s) and/or parts thereof could alternatively be executed by a device other than the processor 812 and/or embodied in firmware or dedicated hardware. Further, although the example program(s) is/are described with reference to the flowcharts illustrated in FIGS. 2-7, many other methods of implementing the example app permission safety system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 2:
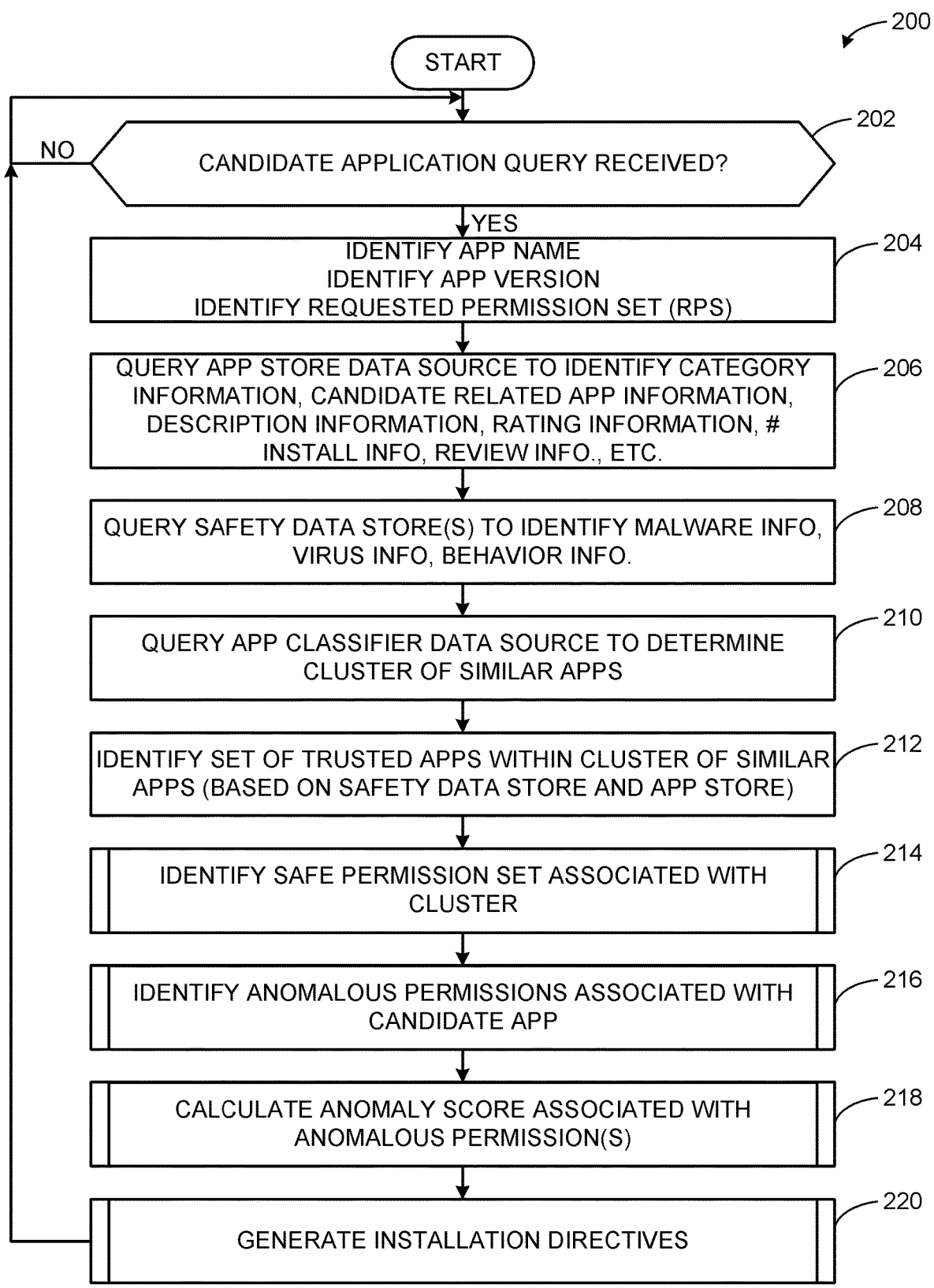
FIGS. 2-7 are flowcharts representative of example machine readable instructions which may be executed to implement the example app permission safety system of FIG. 1A.

The program 200 of FIG. 2 includes block 202, in which the example client interface 130 of the server-side environment 104 determines whether a candidate application query has been received in which the query is associated with a candidate app to be installed on a client computing device (e.g., a mobile phone). If not, the example client interface 130 waits for such an occurrence. When the example client interface 130 detects the candidate application query (block 202), the example app parameter identifier 132 identifies an app name, app version information, and a requested permission set (RPS) (e.g., a list of permissions requested by the candidate app) associated with the candidate app (block 204). The example app infrastructure interface 134 queries the example app store data source 108 to identify category information, candidate related app information, description information, rating information, a number of installs, review information, etc. (block 206). The example safety data interface 136 queries a safety data store 110 to identify malware information, virus information and behavior information associated with the candidate app to be installed (block 208).

The example app classifier interface 138 queries the example app classifier data source 112 to determine a cluster of similar apps (block 210), and the example trusted app (TA) identifier 142 identifies a set of TAs within the cluster of similar apps (block 212). As described above, the TAs may be determined and/or otherwise identified based on corresponding scores or information associated with safety data (e.g., virus reports, malware reports, behavior reports) and/or app store data (user rating information). The example safe permission set evaluator 140 identifies a safe permission set (SPS) (e.g., a list of permissions) associated with the previously identified cluster of similar apps (block 214), as described above and in further detail below. The example SPS evaluator 140 also identifies anomalous permissions associated with the candidate app to be installed (block 216), as described above and in further detail below. The example anomaly score determiner 148 calculates anomaly scores associated with those permissions identified as anomalous (block 218), and the example client device installation controller 150 generates one or more installation directives (block 220).

Figure 3:
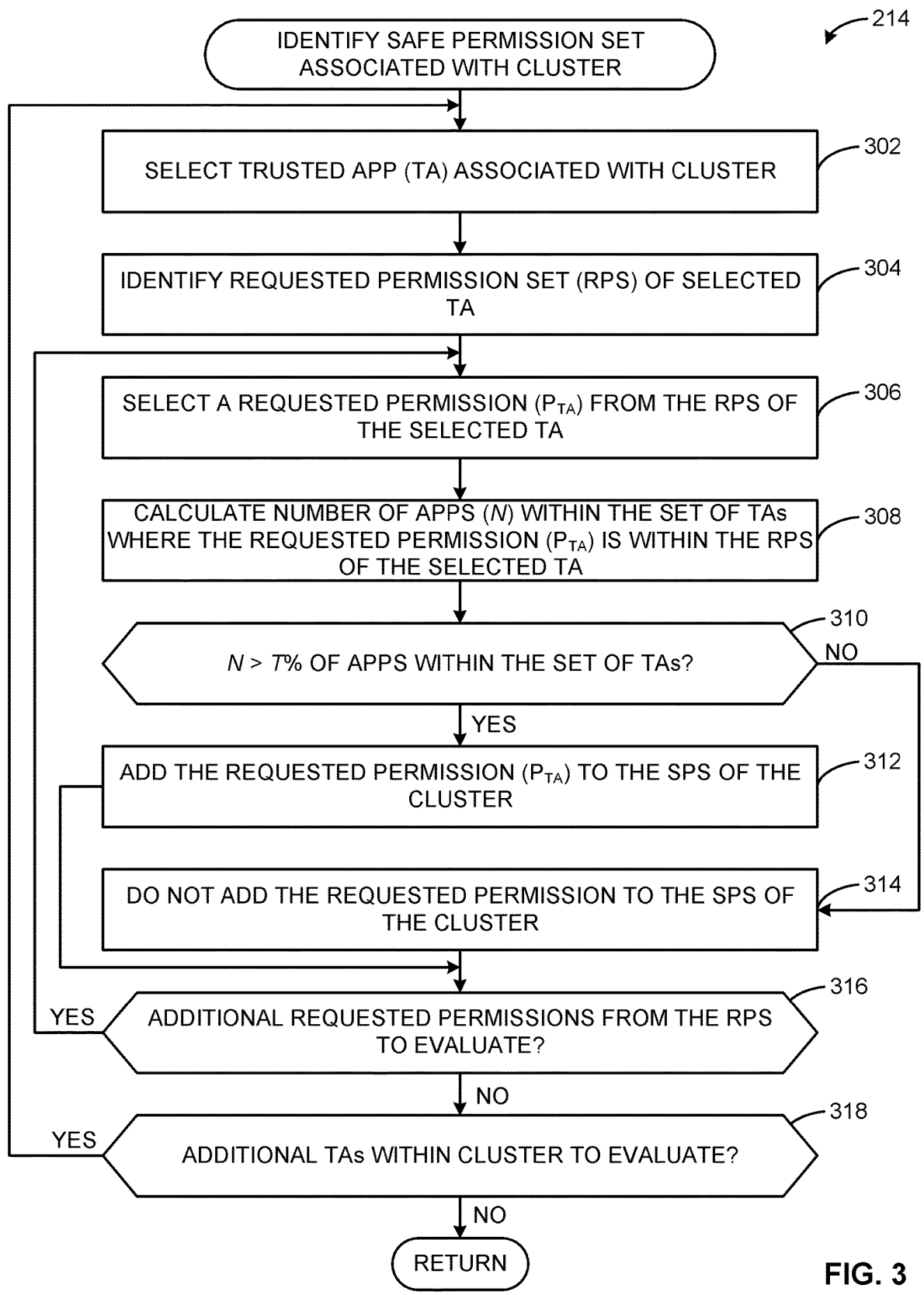

FIG. 3 illustrates additional detail associated with identification of the SPS associated with the cluster of similar apps (block 214). In the illustrated example of FIG. 3, the TA identifier 142 selects a TA of the cluster (block 302), and the requested permission set identifier 144 identifies an RPS of the selected TA (block 304). Additionally, the example requested permission set identifier 144 selects one of the requested permissions from the RPS of the selected TA (block 306), and calculates a number of apps (N) within the set of TAs where the requested permission is also within the RPS (block 308). The example threshold evaluator 146 determines whether the number of apps (N) satisfies (e.g., is greater than) a threshold percentage (T) of apps within the set of TAs (block 310). If so, then the selected permission is added to the SPS (e.g., a list) of the cluster (block 312). Generally speaking, the example threshold percentage (T) may be set to any particular value, in which a relatively higher percentage value is indicative of a greater number of apps sharing the same permission. Stated differently, a higher percentage value would be indicative of a greater degree of normalcy for the requested permission. However, if the threshold value is not satisfied (block 310), then the example SPS evaluator 140 does not add (or prevents the addition of) the requested permission to the SPS of the cluster (block 314).

The example RPS identifier 144 determines whether additional requested permissions from the RPS are to be evaluated (block 316). If so, control returns to block 306, otherwise the example TA identifier 142 determines whether additional TAs within the cluster are to be evaluated (block 318). If so, control returns to block 302, otherwise the illustrated example of FIG. 3 exits/returns to block 216 of FIG. 2.

Figure 4:
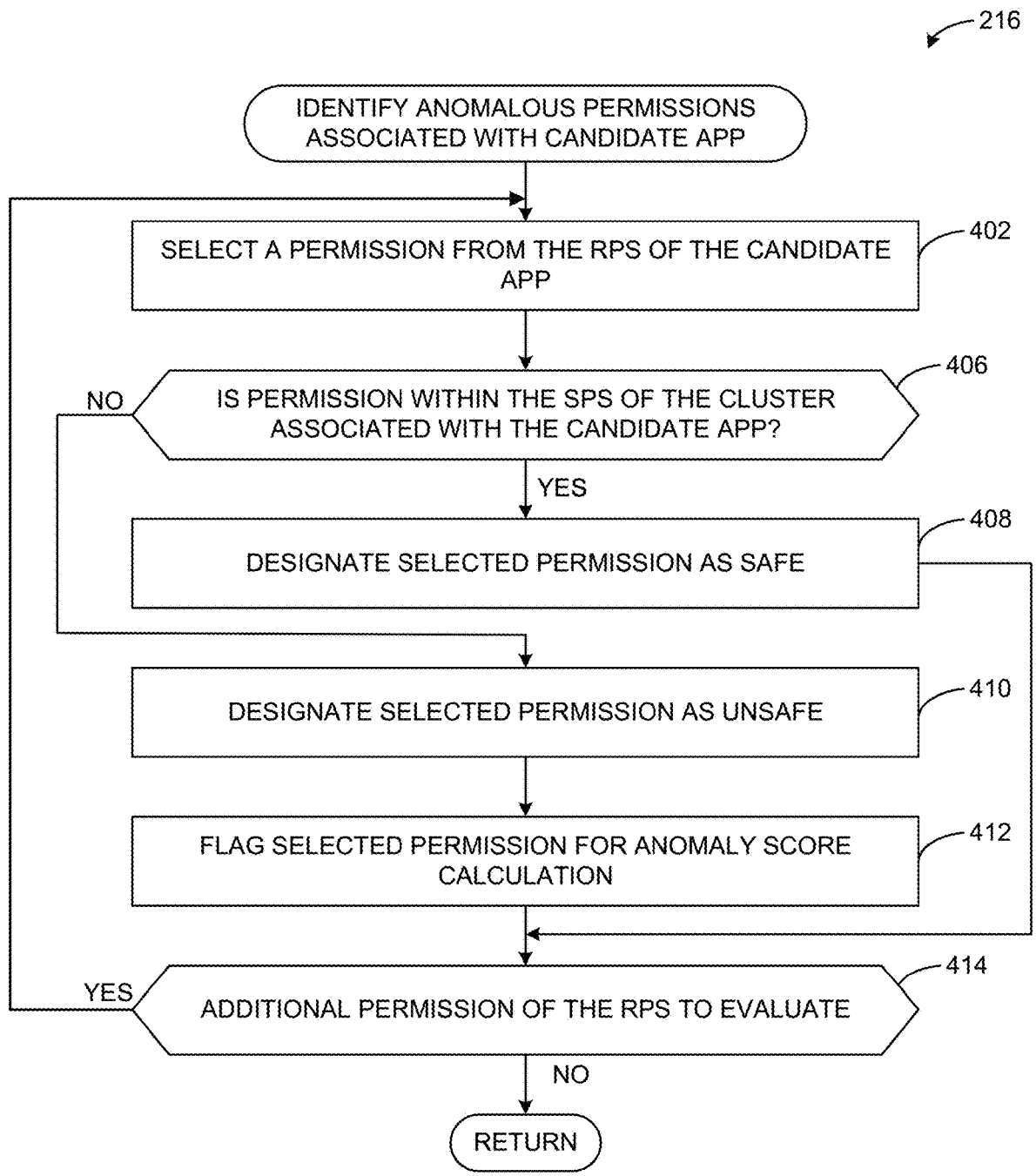

FIG. 4 illustrates additional detail associated with identifying anomalous permissions associated with the candidate app (block 216). In the illustrated example of FIG. 4, the example RPS identifier 144 selects a permission from the RPS of the candidate app (block 402). The example SPS evaluator 140 determines whether the selected permission is within the SPS of the cluster associated with the candidate app (block 406). If so, then the SPS evaluator 140 designates the selected permission as safe (block 408) and the example RPS identifier 144 determines whether there are additional permissions of the RPS to evaluate (block 414). Control returns to block 402 to evaluate another permission.

In the event the example SPS evaluator 140 determines that the selected permission is not within the SPS of the cluster associated with the candidate app (block 406), then it designates the selected permission as unsafe (block 410). Additionally, the example SPS evaluator 140 flags the selected permission for an anomaly score calculation (block 412), as described above and in further detail below. In the event the RPS identifier 144 determines that all permissions of the RPS have been evaluated (block 414), control returns to block 218 of FIG. 2.

Figure 5:
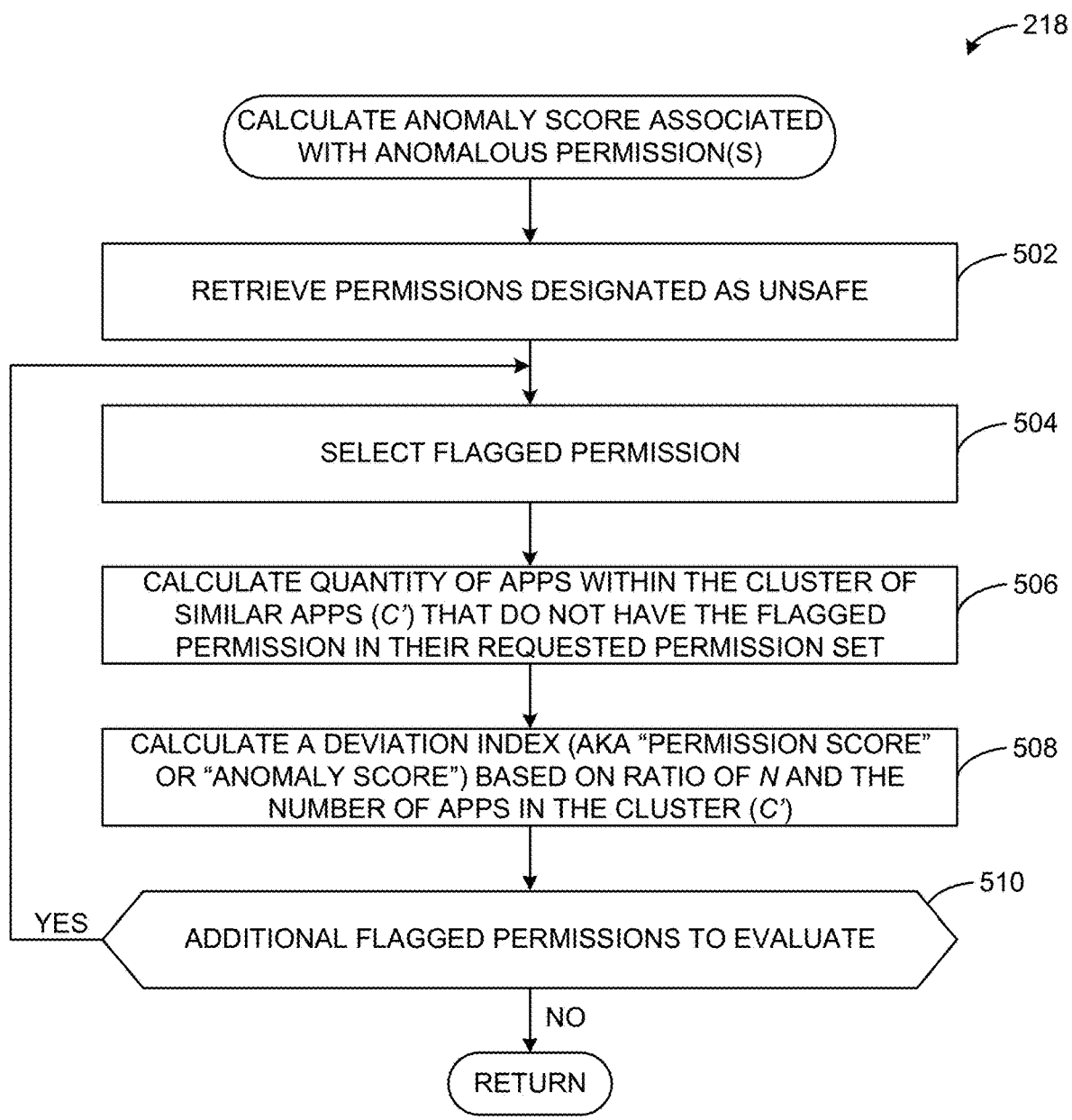

FIG. 5 illustrates additional detail associated with calculating anomaly scores associated with anomalous permissions (block 218). In the illustrated example of FIG. 5, the anomaly score determiner 148 retrieves permissions designated as unsafe (block 502) and selects one of those permissions flagged for scoring (block 504). The example anomaly score determiner 148 determines and/or otherwise calculates a number of apps within the cluster of similar apps (C') that do not have the flagged permission in their respective RPS (N) (block 506). The example anomaly score determiner 148 calculates and/or otherwise determines a deviation index (also referred to herein as a "permission score" or an "anomaly score") based on a ratio thereof, as described above in connection with example Equation 1. The example anomaly score is stored for future use when sending app permission data back to the example client-side anomaly evaluators 116 of respective client devices 114. The example anomaly score determiner 148 determines whether there are one or more additional flagged permissions to evaluate (block 510) and, if so, control returns to block 504. Otherwise, control returns to block 220 of FIG. 2.

Figure 6:
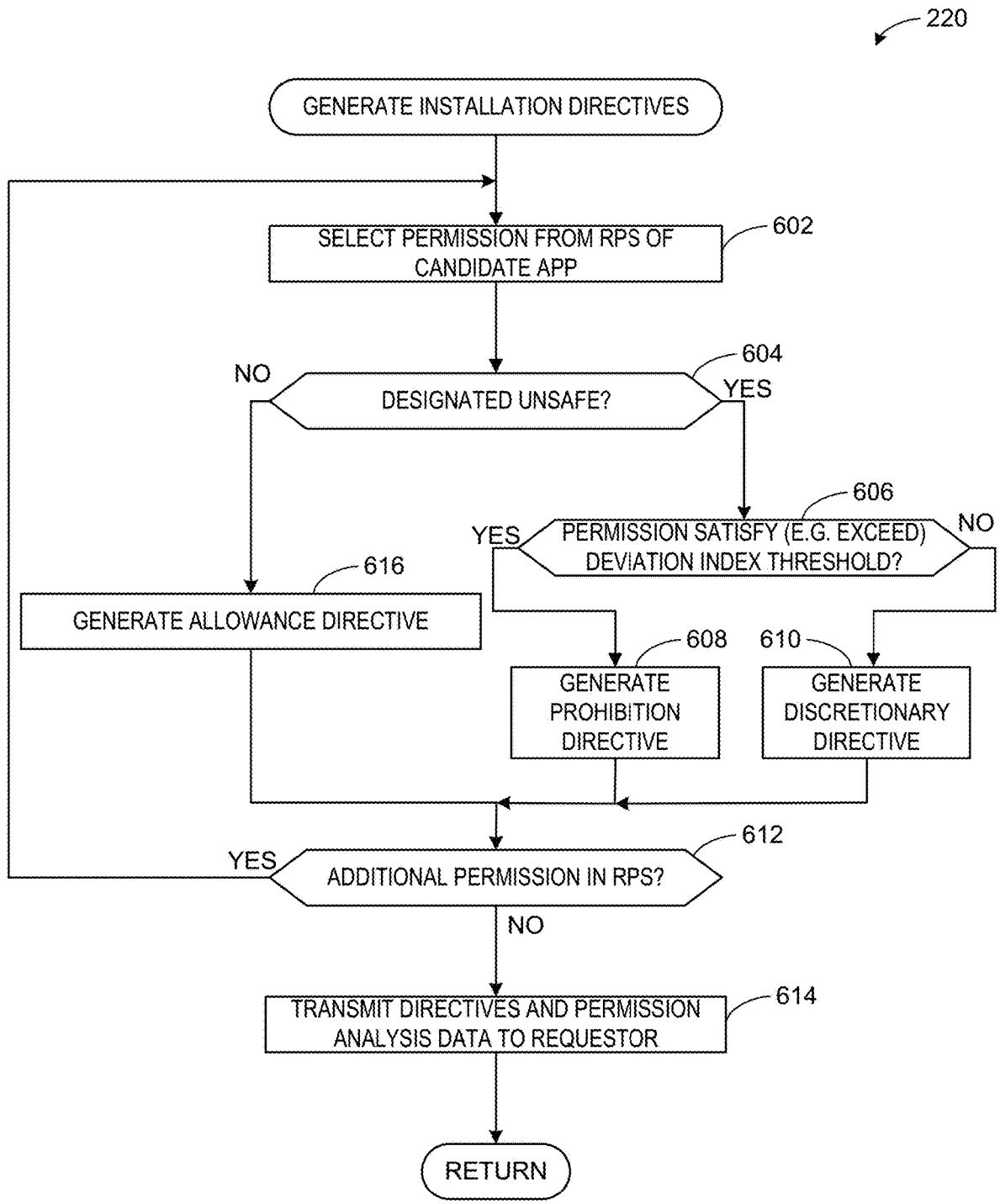

FIG. 6 illustrates additional detail associated with generating installation directives (block 220) of FIG. 2. In the illustrated example of FIG. 6, the example RPS identifier 144 selects a permission from the RPS of the candidate app to be installed (block 602). The example SPS evaluator 140 determines whether the permission is flagged as unsafe (block 604). If not, then the example client device installation controller 150 generates an allowance directive (block 616), and control advances to block 612, where the example RPS identifier 144 determines whether there are one or more additional permissions in the RPS to evaluate. If so, control returns to block 602.

In the event the example SPS evaluator 140 determines that a permission has been previously flagged as unsafe (block 604), then the example threshold evaluator 146 determines whether that particular permission satisfies a deviation index threshold (block 606). If not, then the example client device installation controller 150 generates a discretionary directive (block 610). However, if the deviation index threshold is satisfied (block 606), which is indicative of a greater degree of permission risk that is not appropriate for end-user discretion, then the example client device installation controller 150 generates a prohibition directive (block 608). The example RPS identifier 144 determines whether one or more permissions in the RPS have not yet been evaluated (block 612) and, if more are to be evaluated control returns to block 602. Otherwise, the example client interface 130 transmits the directives and/or other permission analysis data (e.g., permission recommendations to allow/deny, deviation index scores, etc.) to the requestor (e.g., the client 114) (block 614). Control then returns to block 202 of FIG. 2.

Figure 7:
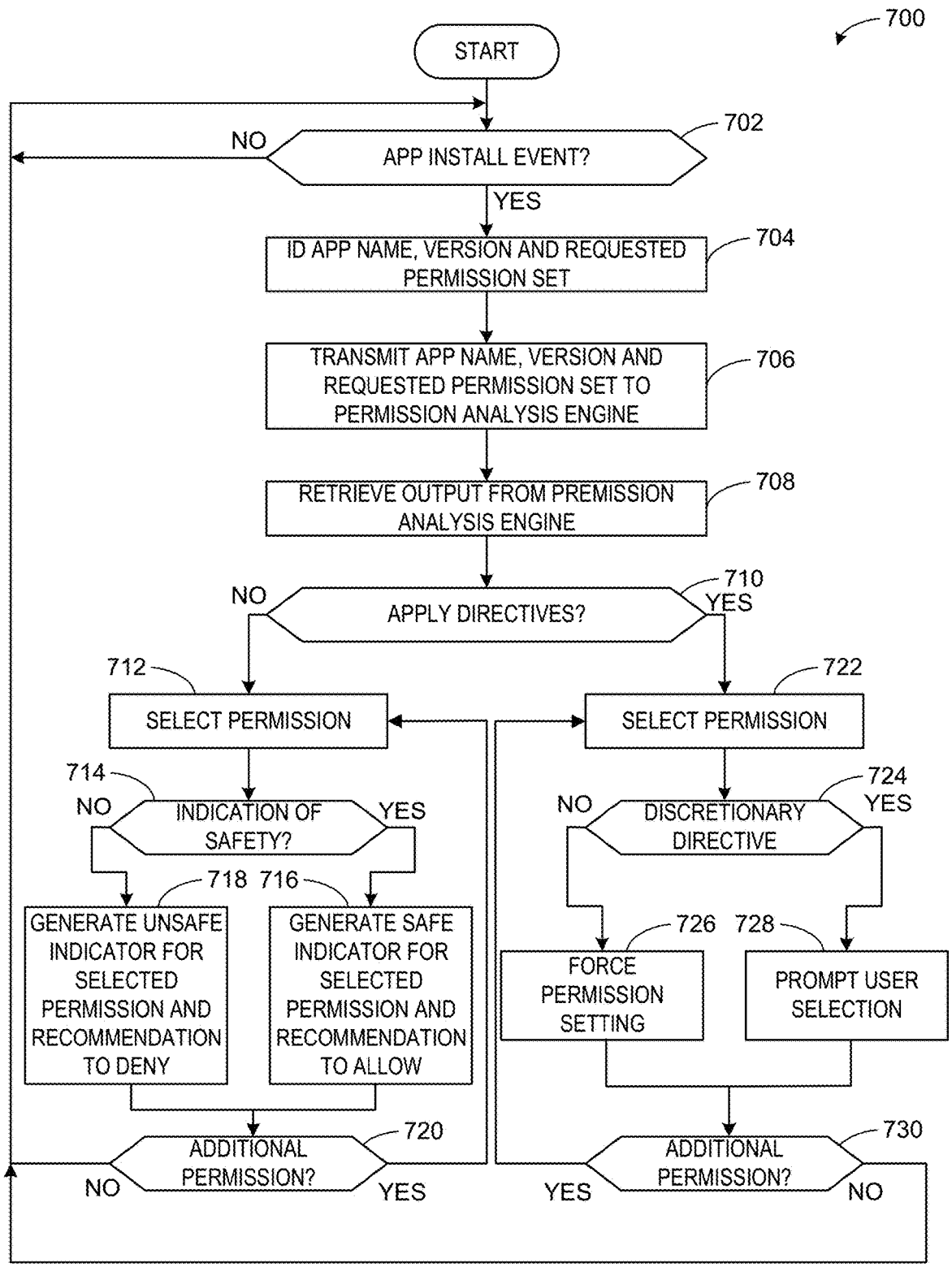

While FIGS. 2-6 represent server-side environment 104 activities, the example program 700 of FIG. 7 illustrates the example client-side environment 102. In the illustrated example of FIG. 7, the example install event detector 118 determines whether an app install event has occurred on the example client device 114 (block 702). In response to an app install event detected by the example install event detector 118 (block 702), the example app parameter acquisition retriever 120 identifies an app name, an app version and a corresponding RPS of the candidate app to be installed (block 704). The example analysis evaluator interface 122 transmits the app name, app version and the RPS to the example permission analysis evaluator 128 to obtain, calculate and/or otherwise verify application permission safety (block 706). The example app permission evaluator 124 retrieves output data from the example permission analysis evaluator 128 (block 708) in a manner consistent with examples disclosed above.

The example recommendation generator 126 determines whether to permit and/or otherwise apply and retrieved directives for the purpose of permission configuration on the destination client device 114 (block 710). In the event directives are not to be used for app permission configuration (block 710), which is typically indicative of a circumstance for users having more familiarity with app permissions and/or a desire of control over how app permissions are configured. However, while some client devices will not permit and/or otherwise apply directives retrieved from the example permission analysis evaluator 128 for the purpose of configuration, other analyzed data from the example permission analysis evaluator 128 is useful for guided recommendations when deciding whether to permit or deny one or more app permissions.

The example app permission evaluator 124 selects a permission of interest (block 712) and determines its corresponding indication of safety (block 714). For a permission with a corresponding indication of safety (block 714), the example recommendation generator 126 generates a safe indicator and a recommendation to allow the permission (e.g., via one or more GUIs) (block 716). For a permission without a corresponding indication of safety (block 714), such as a recommendation to block, the example recommendation generator 126 generates an unsafe indicator and a recommendation to deny the permission (e.g., via one or more GUIs) (block 718). The example app permission evaluator 124 determines whether one or more additional permissions of the candidate app to be installed have been analyzed (block 720) and, if so, control returns to block 712.

In the event the example recommendation generator 126 determines that directives are to be applied when deciding whether to allow or deny app permissions (block 710), the example app permission evaluator 124 selects a permission (block 722) and the example recommendation generator 126 determines whether a corresponding directive is of type discretionary (block 724). If so, then the example recommendation generator 126 prompts for user selection on whether to allow or deny the permission. On the other hand, if the directive is not of a discretionary type (block 724) (e.g., instead, the directive is a prohibition directive or an allowance directive), then the example recommendation generator 126 forces the selected permission configuration as permit or deny based on the directive type (block 726). The example app permission evaluator 124 determines whether there are one or more permissions to analyze (block 730) and, if so, control returns to block 722. Otherwise, control returns to block 702.

Figure 8:
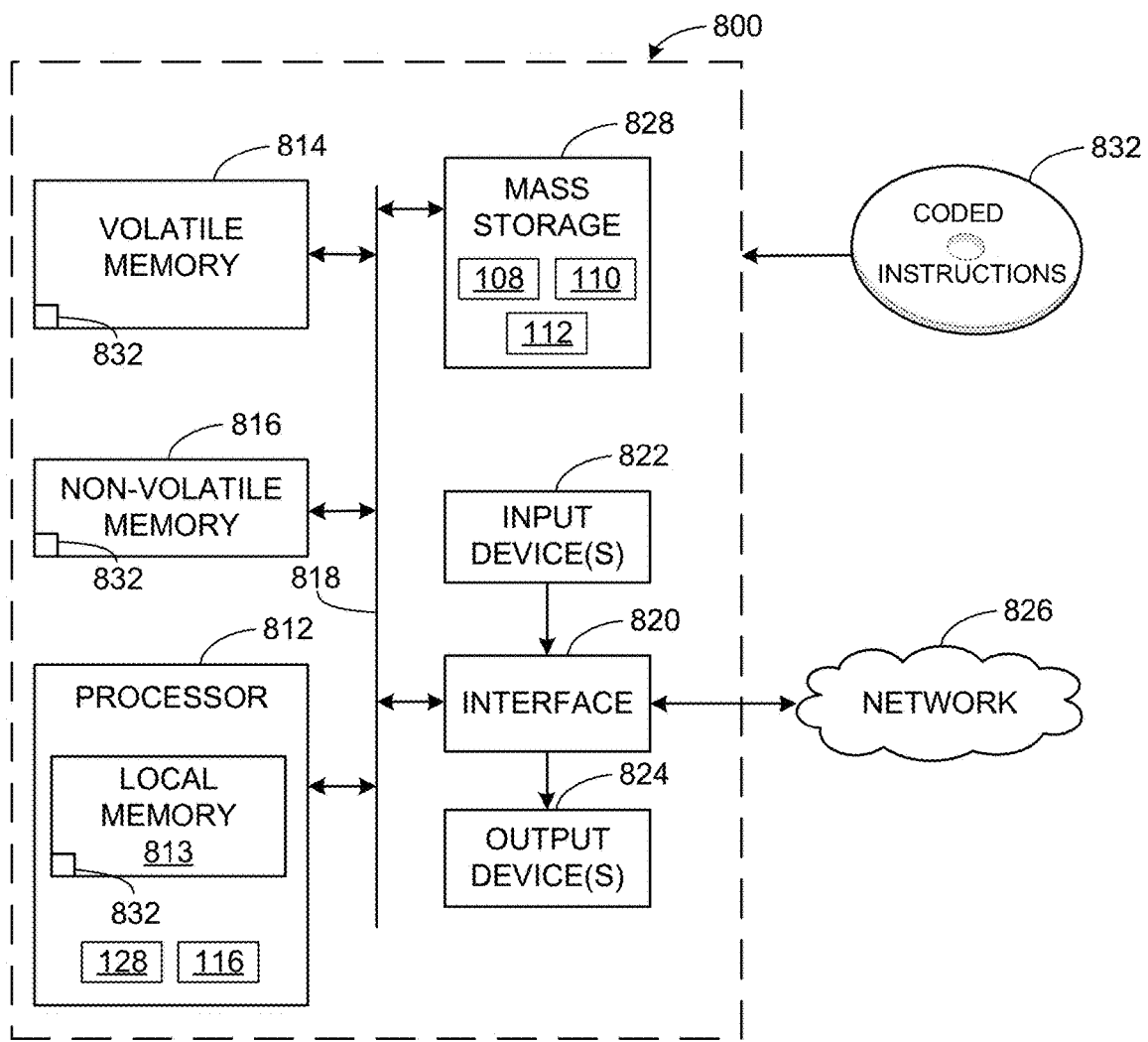
FIG. 8 is a block diagram of an example processing platform structured to execute the instructions of FIGS. 2-7 to implement the example app permission safety system of FIG. 1A.

FIG. 8 is a block diagram of an example processor platform 800 structured to execute the instructions of FIGS. 2-7 to implement the example app permission safety system 100 of FIGS. 1A-1D. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example permission analysis evaluator 128 and structures contained therein, as well as the example client-side anomaly evaluator 116 and structures contained therein.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 2-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that protect user devices from malicious, invasive and/or otherwise superfluous app permissions. Users performing app installation procedures on user devices have, in the past, failed to adequately scrutinize which permissions to allow and which permissions to reject/deny from operating in conjunction with the app being installed. In some examples, users are ignorant of potential risks of certain permissions and proceed with accepting default requests during the installation process to accept any and all requested permissions. However, examples disclosed herein evaluate requested permissions of the app to be installed in a context of other market-available apps to determine whether one or more apps is anomalous and/or otherwise unassociated with an underlying purpose of the app to be installed. Additionally, examples disclosed herein generate installation directives to control installation activities on user devices, in which the installation directives permit app installation on a permission-by-permission basis, thereby protecting user devices when the users are ignorant of permission risks and/or fail to evaluate the risk of the requested permissions during the installation process.

Example systems, methods, articles of manufacture and apparatus to verify application permission safety are disclosed herein. Some such examples and combinations thereof include the following.

Example 1 includes an apparatus to identify unsafe permissions associated with a candidate app, the apparatus comprising an app classifier interface to retrieve a cluster of apps associated with the candidate app, the candidate app including a requested permission set (RPS), a trusted app (TA) identifier to identify a set of TAs within the cluster, the set of TAs associated with a designation of trust, a safe permission set (SPS) evaluator to generate an SPS list associated with the set of TAs within the cluster, and an RPS identifier to determine whether permissions of the RPS are listed in the SPS list, the SPS evaluator further to designate first respective ones of the permissions of the RPS as safe when the first respective ones of the permissions are listed in the SPS list, and designate second respective ones of the permissions of the RPS as unsafe when the second respective ones of the permissions are absent from the SPS list.

Example 2 includes the apparatus as defined in example 1, further including an anomaly score determiner to determine a deviation index for one of the second respective ones of the permissions of the RPS.

Example 3 includes the apparatus as defined in example 2, wherein the anomaly score determiner is to identify a first quantity of the apps within the cluster of apps that do not include the one of the second respective ones of the permissions, the cluster of apps indicative of a second quantity.

Example 4 includes the apparatus as defined in example 3, wherein the anomaly score determiner is to determine the deviation index based on a ratio of the second quantity and the first quantity.

Example 5 includes the apparatus as defined in example 2, further including a threshold evaluator to determine if the deviation index satisfies a deviation index threshold.

Example 6 includes the apparatus as defined in example 5, further including a client device installation controller to generate a prohibition directive when the deviation index satisfies the deviation index threshold, and generate a discretionary directive when the deviation index does not satisfy the deviation index threshold.

Example 7 includes the apparatus as defined in example 6, wherein the prohibition directive is to cause a client device to deny the one of the second respective ones of the permissions of the RPS associated with the candidate app.

Example 8 includes the apparatus as defined in example 6, wherein the discretionary directive is to cause a client device to permit a selection of at least one of allowing or denying the one of the second respective ones of the permissions of the RPS associated with the candidate app.

Example 9 includes the apparatus as defined in example 6, further including a client interface to transmit the prohibition directive or the discretionary directive to a client device.

Example 10 is an apparatus to improve app permission authorization security, the apparatus comprising an app permission evaluator to retrieve a directive associated with a candidate app to be installed on a client device, and a recommendation generator to: determine whether to apply the directive to a selected permission associated with the candidate app, when the directive is to be applied, determine whether the directive is prohibitionary or discretionary, when the directive is prohibitionary, cause the selected permission to be denied on the client device, and when the directive is discretionary, invoke a selection prompt on the client device to enable a user to at least one of allow or deny the permission.

Example 11 includes the apparatus as defined in example 10, wherein the recommendation generator is to cause a deviation index to be displayed on the client device when the directive is of type discretionary.

Example 12 includes the apparatus as defined in example 10, wherein the app permission evaluator is to identify an indication of safety associated with the permission when the directive is to be ignored.

Example 13 includes the apparatus as defined in example 12, wherein the recommendation generator is to invoke a recommendation to deny the permission when the indication of safety is unsafe.

Example 14 includes the apparatus as defined in example 12, wherein the recommendation generator is to invoke a recommendation to allow the permission when the indication of safety is affirmative.

Example 15 is a system to identify unsafe permissions associated with a candidate app, the system comprising means for retrieving a cluster of apps associated with the candidate app, the candidate app including a requested permission set (RPS), means for identifying a set of trusted apps (TAs) within the cluster, the set of TAs including a designation of trust, means for generating a safe permission set (SPS) list associated with the set of TAs within the cluster, and means for determining whether permissions of the RPS are listed in the SPS list, the determining means to: designate first respective ones of the permissions of the RPS as safe when the first respective ones of the permissions are listed in the SPS list, and designate second respective ones of the permissions of the RPS as unsafe when the second respective ones of the permissions are absent from the SPS list.

Example 16 includes the system as defined in example 15, further including means for determining a deviation index for one of the second respective ones of the permissions of the RPS.

Example 17 includes the system as defined in example 16, wherein the determining means is to identify a first quantity value of apps within the cluster of apps associated with the candidate app that do not include the one of the second respective ones of the permissions in an RPS of respective ones of the cluster of apps associated with the candidate app, the cluster of apps indicative of a second quantity value.

Example 18 includes the system as defined in example 17, wherein the determining means is to calculate the deviation index based on a ratio of the second quantity value and the first quantity value.

Example 19 includes the system as defined in example 16, further including means for evaluating if the deviation index satisfies a deviation index threshold.

Example 20 includes the system as defined in example 19, further including means for generating a prohibition directive when the deviation index satisfies the deviation index threshold, the generating means to generate a discretionary directive when the deviation index does not satisfy the deviation index threshold.

Example 21 includes the system as defined in example 20, wherein the prohibition directive is to cause a client device to deny the one of the second respective ones of the permissions of the RPS associated with the candidate app.

Example 22 includes the system as defined in example 20, wherein the discretionary directive is to cause a client device to permit a selection of at least one of allowing or denying the one of the second respective ones of the permissions of the RPS associated with the candidate app.

Example 23 includes the system as defined in example 20, further including means for transmitting the prohibition directive or the discretionary directive to a client device.

Example 24 is a method to identify unsafe permissions associated with a candidate app, the method comprising retrieving, by executing instructions with a processor, a cluster of apps associated with the candidate app, the candidate app including a requested permission set (RPS), identifying, by executing instructions with the processor, a set of trusted apps (TAs) within the cluster, the set of TAs associated with a designation of trust, generating, by executing instructions with the processor, a safe permission set (SPS) list associated with the set of TAs within the cluster, determining, by executing instructions with the processor, whether permissions of the RPS are listed in the SPS list, designating, by executing instructions with the processor, first respective ones of the permissions of the RPS as safe when the first respective ones of the permissions are listed in the SPS list, and designating, by executing instructions with the processor, second respective ones of the permissions of the RPS as unsafe when the second respective ones of the permissions are absent from the SPS list.

Example 25 includes the method as defined in example 24, further including determining a deviation index for one of the second respective ones of the permissions of the RPS.

Example 26 includes the method as defined in example 25, further including identifying a first quantity of the apps within the cluster of apps that do not include the one of the second respective ones of the permissions, the cluster of apps indicative of a second quantity.

Example 27 includes the method as defined in example 26, further including determining the deviation index based on a ratio of the second quantity and the first quantity.

Example 28 includes the method as defined in example 25, further including determining if the deviation index satisfies a deviation index threshold.

Example 29 includes the method as defined in example 28, further including generating a prohibition directive when the deviation index satisfies the deviation index threshold, and generating a discretionary directive when the deviation index does not satisfy the deviation index threshold.

Example 30 includes the method as defined in example 29, further including causing a client device to deny the one of the second respective ones of the permissions of the RPS associated with the candidate app.

Example 31 includes the method as defined in example 29, further including causing a client device to permit a selection of at least one of allowing or denying the one of the second respective ones of the permissions of the RPS associated with the candidate app.

Example 32 includes the method as defined in example 29, further including transmitting the prohibition directive or the discretionary directive to a client device.

Example 33 includes at least one non-transitory computer readable storage media comprising computer readable instructions that, when executed, cause one or more processors to, at least retrieve a cluster of apps associated with the candidate app, the candidate app including a requested permission set (RPS), identify a set of trusted apps (TAs) within the cluster, the set of TAs associated with a designation of trust, generate a safe permission set (SPS) list associated with the set of TAs within the cluster, determine whether permissions of the RPS are listed in the SPS list, designate first respective ones of the permissions of the RPS as safe when the first respective ones of the permissions are listed in the SPS list, and designate second respective ones of the permissions of the RPS as unsafe when the second respective ones of the permissions are absent from the SPS list.

Example 34 includes the at least one storage media as defined in example 33, wherein the computer readable instructions, when executed, cause the one or more processors to determine a deviation index for one of the second respective ones of the permissions of the RPS.

Example 35 includes the at least one storage media as defined in example 34, wherein the computer readable instructions, when executed, cause the one or more processors to identify a first quantity of the apps within the cluster of apps that do not include the one of the second respective ones of the permissions, the cluster of apps indicative of a second quantity.

Example 36 includes the at least one storage media as defined in example 35, wherein the computer readable instructions, when executed, cause the one or more processors to determine the deviation index based on a ratio of the second quantity and the first quantity.

Example 37 includes the at least one storage media as defined in example 34, wherein the computer readable instructions, when executed, cause the one or more processors to determine if the deviation index satisfies a deviation index threshold.

Example 38 includes the at least one storage media as defined in example 37, wherein the computer readable instructions, when executed, cause the one or more processors to generate a prohibition directive when the deviation index satisfies the deviation index threshold, and generate a discretionary directive when the deviation index does not satisfy the deviation index threshold.

Example 39 includes the at least one storage media as defined in example 38, wherein the computer readable instructions, when executed, cause the one or more processors to cause a client device to deny the one of the second respective ones of the permissions of the RPS associated with the candidate app.

Example 40 includes the at least one storage media as defined in example 38, wherein the computer readable instructions, when executed, cause the one or more processors to cause a client device to permit a selection of at least one of allowing or denying the one of the second respective ones of the permissions of the RPS associated with the candidate app.

Example 41 includes the at least one storage media as defined in example 38, wherein the computer readable instructions, when executed, cause the one or more processors to transmit the prohibition directive or the discretionary directive to a client device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify unsafe permissions associated with a candidate app, the apparatus comprising:
    at least one hardware processor;
    an app classifier interface to retrieve a cluster of apps, the cluster of apps indicative of a first quantity, associated with the candidate app, the candidate app including a requested permission set (RPS);
    a trusted app (TA) identifier to identify a set of TAs within the cluster, the set of TAs associated with a designation of trust;
    a safe permission set (SPS) evaluator to generate an SPS list associated with the set of TAs within the cluster;
    an RPS identifier to determine whether permissions of the RPS are listed in the SPS list, the SPS evaluator further to:
        designate first respective ones of the permissions of the RPS as safe when the first respective ones of the permissions are listed in the SPS list; and
        designate second respective ones of the permissions of the RPS as unsafe when the second respective ones of the permissions are absent from the SPS list; and
    an anomaly score determiner to:
        determine a deviation index for one of the second respective ones of the permissions of the RPS; and
        identify a second quantity of the apps within the cluster of apps that do not include the one of the second respective ones of the permissions, at least one of the app classifier, the TA identifier, the SPS evaluation, the RPS identifier, or the anomaly score determiner implemented by the at least one hardware processor.

2. The apparatus as defined in claim 1, wherein the anomaly score determiner is to determine the deviation index based on a ratio of the second quantity and the first quantity.

3. The apparatus as defined in claim 1, further including a threshold evaluator to determine if the deviation index satisfies a deviation index threshold.

4. The apparatus as defined in claim 3, further including a client device installation controller to:
    generate a prohibition directive when the deviation index satisfies the deviation index threshold; and
    generate a discretionary directive when the deviation index does not satisfy the deviation index threshold.

5. The apparatus as defined in claim 4, wherein the prohibition directive is to cause a client device to deny the one of the second respective ones of the permissions of the RPS associated with the candidate app.

6. The apparatus as defined in claim 4, wherein the discretionary directive is to cause a client device to permit a selection of at least one of allowing or denying the one of the second respective ones of the permissions of the RPS associated with the candidate app.

7. The apparatus as defined in claim 4, further including a client interface to transmit the prohibition directive or the discretionary directive to a client device.

8. A method to identify unsafe permissions associated with a candidate app, the method comprising:
    retrieving, by executing instructions with a processor, a cluster of apps associated with the candidate app, the cluster of apps indicative of a first quantity, the candidate app including a requested permission set (RPS);
    identifying, by executing instructions with the processor, a set of trusted apps (TAs) within the cluster, the set of TAs associated with a designation of trust;
    generating, by executing instructions with the processor, a safe permission set (SPS) list associated with the set of TAs within the cluster;
    determining, by executing instructions with the processor, whether permissions of the RPS are listed in the SPS list;
    designating, by executing instructions with the processor, first respective ones of the permissions of the RPS as safe when the first respective ones of the permissions are listed in the SPS list;
    designating, by executing instructions with the processor, second respective ones of the permissions of the RPS as unsafe when the second respective ones of the permissions are absent from the SPS list;
    determining a deviation index for one of the second respective ones of the permissions of the RPS; and
    identifying a second quantity of the apps within the cluster of apps that do not include the one of the second respective ones of the permissions.

9. The method as defined in claim 8, further including determining the deviation index based on a ratio of the second quantity and the first quantity.

10. The method as defined in claim 8, further including determining if the deviation index satisfies a deviation index threshold.

11. The method as defined in claim 10, further including:
    generating a prohibition directive when the deviation index satisfies the deviation index threshold; and
    generating a discretionary directive when the deviation index does not satisfy the deviation index threshold.

12. At least one non-transitory computer readable storage media comprising computer readable instructions that, when executed, cause one or more processors to, at least:
    retrieve a cluster of apps associated with the candidate app, the cluster of apps indicative of a first quantity, the candidate app including a requested permission set (RPS);
    identify a set of trusted apps (TAs) within the cluster, the set of TAs associated with a designation of trust;
    generate a safe permission set (SPS) list associated with the set of TAs within the cluster;

determine whether permissions of the RPS are listed in the SPS list;

designate first respective ones of the permissions of the RPS as safe when the first respective ones of the permissions are listed in the SPS list;

designate second respective ones of the permissions of the RPS as unsafe when the second respective ones of the permissions are absent from the SPS list;

determine a deviation index for one of the second respective ones of the permissions of the RPS; and identify a second quantity of the apps within the cluster of apps that do not include the one of the second respective ones of the permissions.

13. The at least one storage media as defined in claim 12, wherein the computer readable instructions, when executed, cause the one or more processors to determine the deviation index based on a ratio of the second quantity and the first quantity.

14. The at least one storage media as defined in claim 12, wherein the computer readable instructions, when executed, cause the one or more processors to determine if the deviation index satisfies a deviation index threshold.

\* \* \* \* \*